United States Patent Office 2,778,824
Patented Jan. 22, 1957

2,778,824

BASIC ALKOXYALKYL ESTERS OF PHENOTHIAZINE-10-CARBOXYLIC ACID

Carl von Seemann, Westmount, Quebec, Canada, assignor to American Home Products Corporation, New York, N. Y., a corporation of Delaware No Drawing. Application July 13, 1955, Serial No. 521,927

9 Claims. (Cl. 260—243)

This application is a continuation-in-part of my copending application, Serial No. 485,340, filed January 31, 1955, (now abandoned).

This invention relates to novel basic alkoxyalkyl esters of phenothiazine-10-carboxylic acid and their acid addition and quaternary salts. It also relates to the process for preparing these novel compounds.

These new chemical compounds may be represented by the following general formula:

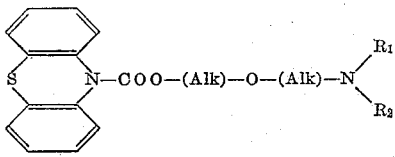

in particular where Alk represents a straight chain alkylene group containing 2 carbon atoms, and $R_1$ and $R_2$ represent lower straight or branched chain alkyl groups. These alkyl groups may also be linked with each other directly to form a pyrrolidine or piperidine ring, or they may be linked through a further hetero atom such as oxygen to form a morpholine ring. In all cases these heterocyclic groups are attached to the alkylene group through nitrogen.

The new compounds are useful as medicinal agents. My novel basic alkoxyalkyl esters possess comparatively little atropine-like properties. Their primary activity is as a relaxing agent for smooth muscle, which property seems to be a function of the ether linkage which is present in the basic ester group.

Novel basic esters of the specified generic or type formula will form acid addition salts with a variety of inorganic and organic acids. Among such may be mentioned the acid addition salts with hydrochloric, hydrobromic, sulfuric, maleic, oxalic, tartaric, citric, picric, and picrolonic acids, etc. The novel basic esters will also form quaternary ammonium salts such as the methochloride, methobromide, ethobromide, methiodide, ethiodide, methosulfate, etc. Both acid addition and quaternary ammonium salts are pharmacologically effective.

In preparing the novel basic esters, a phenothiazine-10-carboxylic acid halide may be reacted with the basically substituted alkoxyalkanol whose ester is desired, the reaction being preferably carried out under essentially anhydrous conditions. For example, phenothiazine-10-carboxylic acid chloride may be reacted with an excess of the basically substituted alkoxyalkanol, with agitation, and under essentially anhydrous conditions, for a period of time ranging from 1 to several hours and at a temperature not exceeding 120° C. The temperature is preferably kept within the range 100–110° C. The reaction mixture is then poured on ice, the oily precipitate repeatedly washed by decantation with ice water, taken up in an inert water-immiscible solvent such as benzene, and washed with water until substantially all of the excess basic alkoxyalkanol has been removed. This results in the desired basically substituted alkoxyalkyl ester of phenothiazine-10-carboxylic acid, which, after drying, may be obtained by evaporation of the solvent.

The basically substituted alkoxyalkyl ester may be readily converted to an acid addition salt by dissolving it in an anhydrous inert solvent, such as ethyl ether, and precipitating it by the addition to the solution of a small excess of the acid whose salt is desired, this acid being preferably added in the form of a solution thereof in an anhydrous inert solvent which is miscible with the solvent in which the basically substituted alkoxyalkyl ester of phenothiazine-10-carboxylic acid is dissolved. This procedure results in the desired acid addition salt. Purification of the salt may be effected by dissolving it under anhydrous conditions in a lower alcohol, such as methanol, or a lower ketone, such as acetone, and reprecipitating it from the solution by the addition thereto of an inert solvent in which it is relatively insoluble such, for example, as ethyl ether.

The basically substituted alkoxyalkyl ester may also be readily converted to a quaternary ammonium salt thereof. This may be done by reacting it in an anhydrous inert solvent, such as ethyl ether, with an excess of the appropriate alkyl halide or alkyl sulfate. The reaction is preferably carried out at a slightly elevated temperature, such as one within the range 30–65° C. A period of from 1 to several days may be needed for the reaction to be complete. The precipitated quaternary ammonium salts may be purified by the same procedure as described above for the purification of the acid addition salts.

The following examples are illustrative of my invention.

*Example 1*

5.23 grams of phenothiazine-10-carboxylic acid chloride were suspended in 16 grams of β-diisopropylaminoethoxyethanol and heated, with stirring, under anhydrous conditions, first for 1 hour at a temperature of 50–105° C., then for another hour at 108–110° C. All the suspended acid chloride had dissolved after the final heating, and the solution was then allowed to cool slowly to 75° C. over a period of one hour. Infra-red examination of a sample showed that the esterification reaction was essentially complete after the second hour.

The reaction mixture was then poured on 1 liter of crushed ice, and the oily precipitate washed repeatedly by decantation with ice water. It was then taken up in 75 milliliters of benzene, and again washed repeatedly with water until a pH of 8.2 in the washings indicated that substantially all of the excess β-diisopropylaminoethoxyethanol had been removed. The benzene solution was then dried with anhydrous sodium sulfate, filtered, and the benzene evaporated in a current of dry nitrogen gas. The residual dark oil constituted the desired basic ester, β-diisopropylaminoethoxyethyl phenothiazine-10-carboxylate.

By following the procedure as described, but using 8 grams dimethylaminoethoxyethanol and 9.7 grams diethylaminoethoxyethanol, β-dimethylaminoethoxyethyl phenothiazine-10-carboxylate, and β-diethylaminoethoxyethyl phenothiazine-10-carboxylate were both obtained.

*Example 2*

A sample of β-diisopropylaminoethoxyethyl phenothiazine-10-carboxylate as obtained in Example 1 was dissolved in anhydrous ether and precipitated from the solution by adding thereto a slight excess of an ethereal solution of picric acid. The resulting picrate salt was repeatedly washed with dry ether. It was then purified by repeatedly redissolving it in anhydrous methanol, diluting, and reprecipitating the salt by the addition of 15 volumes of dry ether to each solution. There was thus obtained an amorphous glassy product. Elementary analysis confirmed its structure as β-diisopropylaminoethoxyethyl phenothiazine-10-carboxylate monopicrate, $C_{29}H_{33}O_{10}N_5S$.

*Example 3*

Samples of the basic esters as obtained in Example 1 were dissolved in anhydrous ether and then precipitated by adding a slight excess of a solution of dry hydrogen chloride in ether. The resulting gums were purified by the procedure described in Example 2 as applied to the corresponding picrate salt, and the hydrochloride salts isolated as amorphous, glass-like products, which could be crystallized from anhydrous acetone or from methanol-ether. In this manner there were obtained as stable, crystalline, colorless substances β - dimethylamino - ethoxyethyl phenothiazine-10-carboxylate hydrochloride, one sample of which melted at 161–163° C. with decomposition, cal. for $C_{19}H_{23}O_3N_2S$ Cl, Cl: 9.02%, found Cl: 9.36%; β-diethylaminoethoxyethyl phenothiazine-10-carboxylate hydrochloride, one sample of which melted at 182–183° C. with decomposition, cal. for $C_{21}H_{27}O_3N_2S$ Cl, Cl: 8.42%, found Cl: 8.42%; and β - diisopropylaminoethoxyethyl phenothiazine - 10 - carboxylate hydrochloride, one sample of which melted at 149–150° C., cal. for $C_{23}H_{31}O_3N_2S$ Cl, Cl: 7.88%, found Cl: 7.83%.

*Example 4*

A sample of β-diisopropylaminoethoxyethyl phenothiazine-10-carboxylate as obtained in Example 1 was dissolved in anhydrous ether, and to the solution there was then added a small excess of an ethereal solution of maleic acid. The resulting precipitate was purified by following the procedure described in Example 2. β-diisopropylaminoethoxyethyl phenothiazine-10-carboxylate maleate was thereby recovered, the salt being an amorphous, hygroscopic product as precipitated from the anhydrous methanol solution.

*Example 5*

A sample of the basic ester, β-diisopropylaminoethoxyethyl phenothiazine-10-carboxylate, as obtained by the procedure described in Example 1, was dissolved in anhydrous ether and the solution then treated with a small excess of an ethereal solution of tartaric acid. The resulting precipitate was purified by following the procedure described in connection with the purification and recovery of the corresponding picrate salt in Example 2. There was thus obtained the amorphous, hygroscopic tartrate salt of β-diisopropylaminoethoxyethyl phenothiazine-10-carboxylate.

*Example 6*

By following the procedure described in Example 2, but utilizing initially an ethereal solution of oxalic acid instead of the ethereal solution of picric acid there employed, the corresponding oxalate salt of β-diisopropylaminoethoxyethyl phenothiazine-10-carboxylate was secured.

By reacting the basic ester β-diisopropylaminoethoxyethyl phenothiazine-10-carboxylate with a solution of picrolonic acid in ether (instead of the ethereal solution of picric acid used in Example 2) there was obtained the picrolonate of the basic ester. In each case the crude salts were washed with dry ether, and purified by repeatedly redissolving in anhydrous methanol, diluting, and reprecipitating the salts by the addition of dry ether to the diluted solutions, following the proportions and recovery procedure as described in Example 2.

*Example 7*

A sample of β-diisopropylaminoethoxyethyl phenothiazine-10-carboxylate as prepared in accordance with the procedure described in Example 1 was dissolved in anhydrous ether. The resulting solution was heated to 60° C. in a sealed tube with an excess of methyl bromide, the heating being continued for 4 days. This resulted in a crystalline precipitate which was purified and recovered by following the procedure described in Example 2. Elemental analysis confirmed the crystalline product to be the quaternary ammonium salt, β-diisopropylaminoethoxyethyl phenothiazine-10-carboxylate methobromide, one sample of which melted at 157–158° C. with decomposition, calc. for $C_{24}H_{33}O_3N_2S$ Br, Br: 15.67%, found Br: 15.86%. By following the procedure as described, but starting with β-dimethylaminoethoxyethyl phenothiazine - 10 - carboxylate and β - diethylaminoethoxyethyl phenothiazine-10-carboxylate the corresponding methobromides were obtained; thus, β-dimethylaminoethoxyethyl phenothiazine-10-carboxylate methobromide, one sample of which melted at 136–138° C. with decomposition, calc. for $C_{20}H_{25}O_3N_2S$ Br, Br: 17.65%, found Br: 17.58%, and β-diethylaminoethoxyethyl phenothiazine-10-carboxylate methobromide, one sample of which melted at 134° C., calc. for $C_{22}H_{29}O_3N_2S$ Br, Br: 16.62%, found, Br: 16.45%.

Various changes and modifications may be made in my invention as described which would still be within the scope of the above description. Such changes and modifications are intended to be included within the scope of the appended claims.

I claim:

1. A compound selected from the group which consists of the basic esters of the formula:

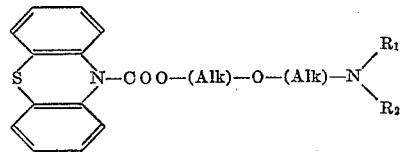

where Alk represents a straight chain alkylene group containing two carbon atoms, and $R_1$ and $R_2$ each represent lower alkyl; their acid addition salts with hydrochloric, hydrobromic, sulfuric, maleic, oxalic, tartaric, citric, picric and picrolonic acids; and their methochloride, methobromide, ethobromide, methiodide, ethiodide and methosulfate quaternary ammonium salts.

2. A basic ester of the formula:

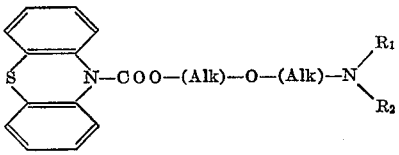

where Alk represents a straight chain alkylene group containing two carbon atoms, and $R_1$ and $R_2$ each represent lower alkyl.

3. β-dimethylaminoethoxyethyl phenothiazine-10-carboxylate.

4. β-dimethylaminoethoxyethyl phenothiazine-10-carboxylate methobromide.

5. β-diethylaminoethoxyethyl phenothiazine - 10 - carboxylate.

6. β-diisopropylaminoethoxyethyl phenothiazine - 10 - carboxylate.

7. β-diisopropylaminoethoxyethyl phenothiazine - 10 - carboxylate hydrochloride.

8. The process of preparing a compound of the formula:

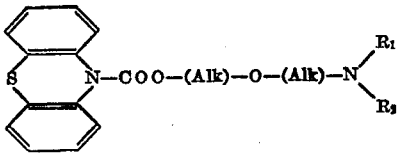

where Alk represents a straight chain alkylene group containing two carbon atoms, and $R_1$ and $R_2$ are each selected from the group which consists of lower straight chain alkyl groups and lower branched chain alkyl groups, which comprises bringing together, at an elevated temperature not exceeding 120° C. and under substantially anhydrous conditions, phenothiazine-10-carboxylic acid chloride and a β-di-(lower alkyl)-aminoethoxy ethanol.

9. The process of preparing β-diisopropylaminoethoxyethyl phenothiazine - 10 - carboxylate which comprises bringing together, at an elevated temperature not exceeding 120° C. and under substantially anhydrous conditions, phenothiazine-10-carboxylic acid chloride and β-diisopropylaminoethoxyethanol.

References Cited in the file of this patent

UNITED STATES PATENTS

| 2,650,919 | Cusic | Sept. 1, 1953 |

FOREIGN PATENTS

| 708,896 | Great Britain | May 12, 1954 |